United States Patent
Hiyama et al.

(10) Patent No.: US 11,566,825 B2
(45) Date of Patent: Jan. 31, 2023

(54) ABSORPTION CHILLER

(71) Applicant: Yazaki Energy System Corporation, Tokyo (JP)

(72) Inventors: Osamu Hiyama, Hamamatsu (JP); Takahide Sugiyama, Hamamatsu (JP)

(73) Assignee: YAZAKI ENERGY SYSTEM CORPORATION, Tokyo (JP)

(*) Notice: Subject to any disclaimer, the term of this patent is extended or adjusted under 35 U.S.C. 154(b) by 214 days.

(21) Appl. No.: 16/950,254

(22) Filed: Nov. 17, 2020

(65) Prior Publication Data

US 2021/0148617 A1 May 20, 2021

(30) Foreign Application Priority Data

Nov. 19, 2019 (JP) .............................. JP2019-208861

(51) Int. Cl.
*F25B 41/20* (2021.01)
*F25B 15/06* (2006.01)
*F25B 47/02* (2006.01)

(52) U.S. Cl.
CPC .............. *F25B 41/20* (2021.01); *F25B 15/06* (2013.01); *F25B 47/027* (2013.01)

(58) Field of Classification Search
CPC .......... F25B 15/06; F25B 41/20; F25B 30/04; F25B 47/027; F25B 2315/006; F25B 2315/02; F25B 2315/023
See application file for complete search history.

(56) References Cited

U.S. PATENT DOCUMENTS 9,702,597 B1 * 7/2017 El-Shaarawi ......... F25B 27/007
2015/0377541 A1 * 12/2015 Yoshikawa ............... F25B 1/10
62/140

FOREIGN PATENT DOCUMENTS

| CN | 106482381 A | * | 3/2017 | |
| GB | 1435529 A | * | 5/1976 | .............. F25B 15/06 |
| JP | 05118691 A | | 5/1993 | |
| JP | 2000274864 A | * | 10/2000 | |

(Continued)

OTHER PUBLICATIONS

English Translation of CN-106482381-A (Year: 2017).*

(Continued)

*Primary Examiner* — David J Teitelbaum
*Assistant Examiner* — Devon Moore
(74) *Attorney, Agent, or Firm* — Sughrue Mion, PLLC

(57) ABSTRACT

An absorption chiller includes a heating medium supply pipe configured to supply a heating medium from a heating medium pipe to a cooling water pipe; a cooling water discharge pipe configured to discharge a cooling water from the cooling water pipe to the heating medium pipe; a control valve provided on the heating medium supply pipe and the cooling water discharge pipe, respectively; and a controller configured to cause the control valve to be opened and to cause the heating medium in the heating medium pipe to be introduced into the cooling water pipe, when a temperature detected by a cooling water temperature detector is equal to or lower than a predetermined temperature, in a wet lay-up state including a state in which a cooling water inlet shut-off valve and a cooling water outlet shut-off valve are closed and the cooling water pipe is filled with the cooling water.

7 Claims, 5 Drawing Sheets

(56) References Cited

FOREIGN PATENT DOCUMENTS

| | | | | | |
|---|---|---|---|---|---|
| JP | 2002115930 A | * | 4/2002 | ................ | F24F 3/06 |
| JP | 2018141565 A | * | 9/2018 | | |

OTHER PUBLICATIONS

English Translation of JP-2002115930-A (Year: 2002).*
English Translation of JP-2000274864-A (Year: 2000).*
English Translation of JP-2018141565-A (Year: 2018).*

* cited by examiner

ABSORPTION CHILLER

CROSS-REFERENCE TO RELATED APPLICATIONS

This application is based on and claims priority under 35 USC 119 from Japanese Patent Application No. 2019-208861 filed on Nov. 19, 2019, the contents of which are incorporated herein by reference.

TECHNICAL FIELD

The present disclosure relates to an absorption chiller.

BACKGROUND ART

Commonly, in an absorption chiller, dry lay-up in which cooling water is removed is performed to prevent damage to a device due to freezing of cooling water that is not used when the operation is stopped in winter. However, when sufficient drying cannot be performed in the dry lay-up, a large amount of time may be required for the repair work due to generation of metal rust caused by corrosion in a pipe and a water chamber.

Thus, wet lay-up, in which an in-device cooling water system is in a state of being filled with water, has been implemented (see, for example, JPH5118691A). However, in an absorption chiller disclosed in JPH05118691A, it is necessary to prevent damage to a device due to freezing in an environment in which freezing may occur, based on a state in which the wet lay-up is performed. Therefore, in the absorption chiller disclosed in JPH05118691A, when a decrease in the temperature of cooling water is detected, the heating operation is performed and the cooling water is circulated.

In the absorption chiller described in JPH05118691A, the heating operation may be performed. However, when the absorption chiller has no heating function or when there are circumstances that heating operation is not desired, freezing cannot be prevented by the heating operation.

SUMMARY OF INVENTION

The present disclosure provides an absorption chiller that can prevent damage to a device due to freezing while keeping wet lay-up.

According to an aspect of the present disclosure, an absorption chiller configured to obtain a cold water by a cooling cycle having a regenerator, a condenser, an evaporator, and an absorber includes a cooling water pipe that extends from a cooling water inlet to a cooling water outlet via the absorber and the condenser, the cooling water inlet being configured to receive a cooling water from a cooling tower, and the cooling water outlet being configured to discharge the cooling water toward the cooling tower; a heating medium pipe configured to supply a heating medium to the regenerator and to discharge the heating medium whose temperature is lowered in response to heating of a dilute solution in the regenerator; a cooling water inlet shut-off valve provided on the cooling water inlet; a cooling water outlet shut-off valve provided on the cooling water outlet; a heating medium supply pipe configured to supply the heating medium from the heating medium pipe to the cooling water pipe; a cooling water discharge pipe configured to discharge the cooling water from the cooling water pipe to the heating medium pipe; a first control valve provided on the heating medium supply pipe and the cooling water discharge pipe, respectively; a cooling water temperature detector configured to detect a temperature of the cooling water in the cooling water pipe; and a controller configured to cause the first control valve to be opened and to cause the heating medium in the heating medium pipe to be introduced into the cooling water pipe, when the temperature detected by the cooling water temperature detector is equal to or lower than a predetermined temperature, in a wet lay-up state including a state in which the cooling water inlet shut-off valve and the cooling water outlet shut-off valve are closed and the cooling water pipe is filled with the cooling water.

According to another aspect of the present disclosure, an absorption chiller configured to obtain a cold water by a cooling cycle having a regenerator, a condenser, an evaporator, and an absorber includes: a cold water pipe configured to supply the cold water received from a cold water inlet to the evaporator, and to supply the cold water cooled by the evaporator from a cold water outlet to an external target device; a cooling water pipe that extends from a cooling water inlet to a cooling water outlet via the absorber and the condenser, a cooling water inlet being configured to receive a cooling water from a cooling tower, a cooling water outlet being configured to discharge the cooling water toward the cooling tower; a heating medium pipe configured to supply a heating medium to the regenerator and to discharge the heating medium whose temperature is lowered in response to heating of a dilute solution in the regenerator; a cooling water inlet shut-off valve provided on the cooling water inlet; a cooling water outlet shut-off valve provided on the cooling water outlet; a cooling water temperature detector configured to detect a temperature of the cooling water in the cooling water pipe; a controller configured to cause the dilute solution in the regenerator to be heated by the heating medium and to cause an obtained concentrated solution to be supplied to the absorber so as to perform a heat exchange with the cooling water in the cooling water pipe, and to cause a vapor refrigerant generated by the heating of the dilute solution to perform the heat exchange with the cooling water of the cooling water pipe in the condenser, when the temperature detected by the cooling water temperature detector is equal to or lower than a predetermined temperature, in a wet lay-up state including a state in which the cooling water inlet shut-off valve and the cooling water outlet shut-off valve are closed and the cooling water pipe is filled with the cooling water; and a first pressure relief valve provided on the cooling water pipe, the pressure relief valve being configured to relieve an internal pressure in the cooling water pipe generated from heat exchange by the controller.

According to the absorption chiller of the present disclosure, it is possible to prevent damage to a device due to freezing while keeping the wet lay-up.

DESCRIPTION OF EMBODIMENTS

Hereinafter, the present disclosure will be described according to a preferred embodiment. The present disclosure is not limited to the embodiment to be described below, and can be changed as appropriate without departing from the spirit of the present disclosure. In the embodiments described below, some configurations are not shown or described, but it goes without saying that a known or well-known technique is applied as appropriate to details of an omitted technique within a range in which no contradiction occurs to contents described below.

Figure 1:
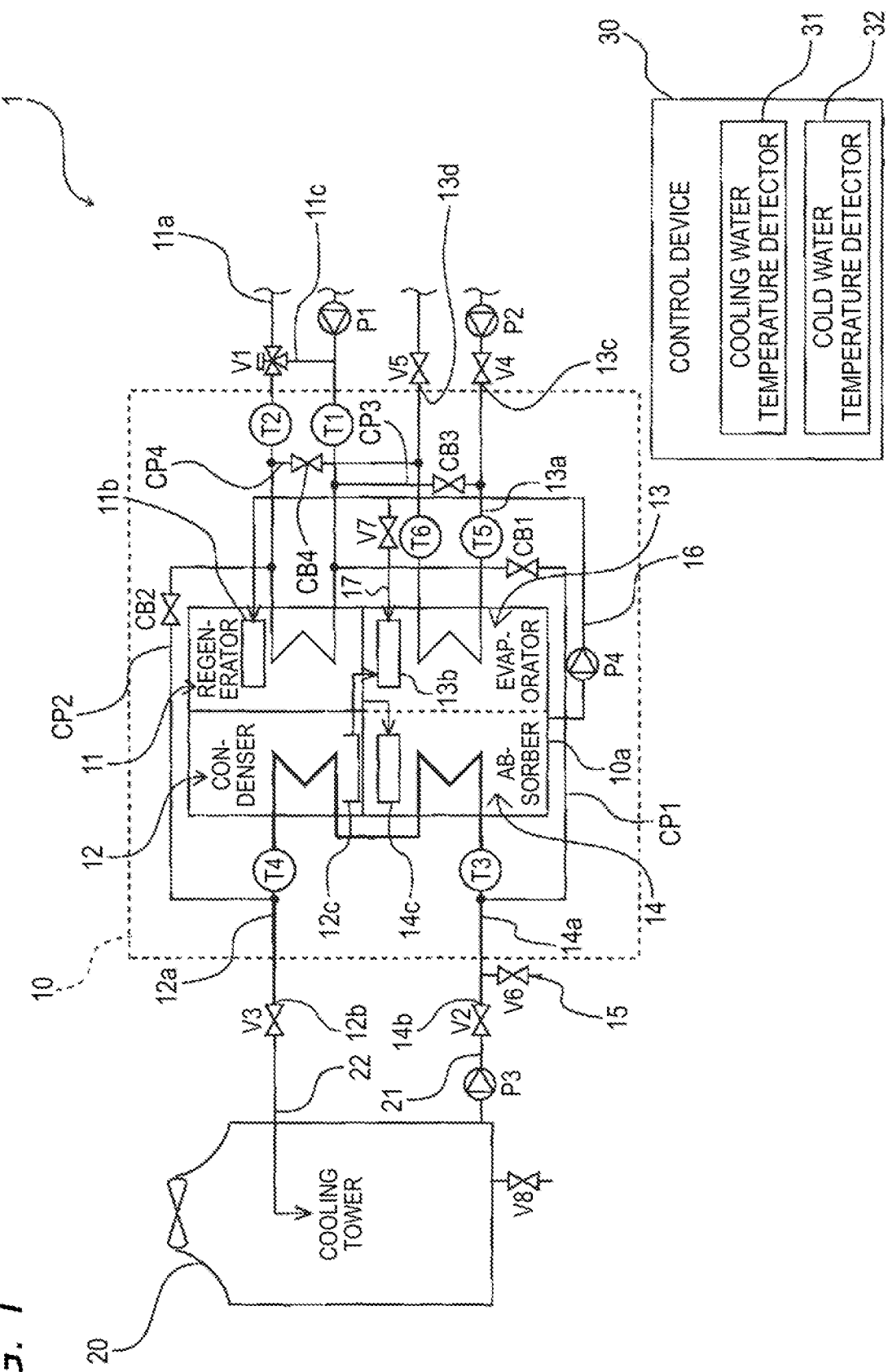
FIG. 1 is a diagram showing a configuration of an absorption chiller according to a first embodiment.

FIG. 1 is a diagram showing a configuration of an absorption chiller according to a first embodiment. As shown in FIG. 1, the absorption chiller 1 includes a cold/hot water machine body 10, a cooling tower 20, various pipes 11a. 12a, 13a, 14a, 15 to 17, 21, and 22, various valves V1 to V8, various pumps P1 to P4, various temperature sensors T1 to T6, communication pipes CP1 to CP4, communication valves CB1 to CB4, and a control device (controller) 30.

The cold/hot water machine body 10 heats a dilute solution in a regenerator 11, and obtains cold water by a cooling cycle of the regenerator 11, a condenser 12, an evaporator 13, and an absorber 14. The regenerator 11, the condenser 12, the evaporator 13, and the absorber 14 are accommodated in a housing 10a.

The regenerator 11 heats, for example, a dilute solution (a solution containing an absorbing liquid in a low concentration) obtained by mixing water serving as a refrigerant (hereinafter, a vaporized refrigerant is referred to as a vapor refrigerant, and a liquefied refrigerant is referred to as a liquid refrigerant) with a lithium bromide (LiBr) serving as an absorbing liquid. In the first embodiment, a heating medium pipe 11a is inserted into the regenerator 11. The heating medium pipe 11a supplies a heating medium (for example, waste-heat hot water of a molding machine or a generator in a factory) to the regenerator 11, and discharges a heating medium whose temperature is lowered due to heating of the dilute solution in the regenerator 11. A dilute solution distributor 11b is provided in the regenerator 11. The dilute solution distributor 11b sprays a dilute solution from the absorber 14 onto the heating medium pipe 11a. By this spray, the dilute solution is heated and separated into a concentrated solution and a vapor refrigerant.

The heating medium pipe 11a herein is provided with a heating medium pump P1, a heating medium bypass pipe 11c, and a three-way valve V1. The heating medium pump P1 is a power source for supplying a heating medium to the regenerator 11. The heating medium pump P1 may also be used as a pump or the like for supplying cooling water to, for example, a generator. The heating medium bypass pipe 11c is connected to the heating medium pipe 11a at one end side and the other end side thereof, and forms a flow path that bypasses without supplying a heating medium to the regenerator 11. The three-way valve V1 is provided on the heating medium pipe 11a and is connected to one end of the heating medium bypass pipe 11c. The three-way valve V1 controls the flow of a heating medium.

The condenser 12 liquefies a vapor refrigerant supplied from the regenerator 11. A first cooling water pipe (cooling water pipe) 12a is inserted into the condenser 12. Cooling water is supplied from the cooling tower 20 to the first cooling water pipe 12a, and the vapor refrigerant evaporated by the regenerator 11 is liquefied by the cooling water in the first cooling water pipe 12a. Further, the liquid refrigerant liquefied by the condenser 12 is stored in a refrigerant storage chamber 12c and then is supplied to the evaporator 13. A downstream end of the first cooling water pipe 12a serves as a cooling water outlet 12b for sending cooling water toward the cooling tower 20, and the cooling water outlet 12b is provided with a cooling water outlet shut-off valve V3.

The evaporator 13 evaporates a liquid refrigerant. The evaporator 13 is provided with a cold water pipe 13a and a refrigerant distributor 13b for receiving the liquid refrigerant from the refrigerant storage chamber 12c. The cold water pipe 13a is connected to, for example, an indoor unit (an example of an external target device), and is capable of supplying cold water received from a cold water inlet 13c to the evaporator 13 and supplying cold water cooled by the evaporator 13 to the indoor unit (the example of the external target device) from a cold water outlet 13d. The cold water circulates between the evaporator 13 and the indoor unit using a cold water pump P2 as a power source. In addition, the inside of the evaporator 13 is in a vacuum state. Therefore, an evaporation temperature of water as the refrigerant is about 5° C. Therefore, a liquid refrigerant sprayed onto the cold water pipe 13a by the refrigerant distributor 13b is evaporated according to a temperature of the cold water pipe 13a. Temperature of the cold water in the cold water pipe 13a is deprived by evaporation of the liquid refrigerant. As a result, the cold water of the cold water pipe 13a is supplied to the indoor unit in a state in which the temperature of the cold water is lowered, and the indoor unit supplies cold air to a room by using the cold water.

The cold water pipe 13a is provided with a cold water inlet shut-off valve V4 and a cold water outlet shut-off valve V5. The cold water inlet shut-off valve V4 controls the supply and the cutoff of cold water to the evaporator 13 and is provided on the cold water inlet 13c. The cold water outlet shut-off valve V5 controls the discharge and the cutoff of cold water from the evaporator 13 and is provided on the cold water outlet 13d.

The absorber 14 absorbs a refrigerant evaporated in the evaporator 13. In the absorber 14, a concentrated solution distributor 14c for receiving a concentrated solution from the regenerator 11 is provided, and the concentrated solution is sprayed in the absorber 14 from the concentrated solution distributor 14c. As a result, the refrigerant evaporated by the evaporator 13 is absorbed by the concentrated solution to be sprayed, and a dilute solution is generated. A second cooling water pipe (cooling water pipe) 14a is inserted into the absorber 14. Cooling water from the cooling tower 20 flows to the second cooling water pipe 14a using a cooling water pump P3 as a power source, and absorption heat generated by absorption of the refrigerant by the concentrated solution is removed by the cooling water in the second cooling water pipe 14a.

A lower portion of the absorber 14 is connected to the dilute solution distributor 11b of the regenerator 11 by a solution circulation pipe (dilute solution pipe) 16. The solution circulation pipe 16 is provided with a solution pump P4. Therefore, the dilute solution whose concentration is reduced by the absorption of the refrigerant is supplied to the dilute solution distributor 11b of the regenerator 11 by the solution pump P4. An upstream end of the second cooling water pipe 14a serves as a cooling water inlet 14b for supplying cooling water from the cooling tower 20, and the cooling water inlet 14b is provided with a cooling water inlet shut-off valve V2.

Here, the second cooling water pipe 14a is connected to the first cooling water pipe 12a. The first cooling water pipe 12a and the second cooling water pipe 14a are pipes using, for example, copper, iron, or the like from the viewpoint of increasing thermal conductivity of the cooling water, and cannot be subjected to plating processing such as corrosion prevention. The first cooling water pipe 12a and the second cooling water pipe 14a function as a cooling water pipe extending from the cooling water inlet 14b to the cooling water outlet 12b via the absorber 14 and the condenser 12.

The heating medium pipe 11a is provided with a heating medium inlet temperature sensor T1 and a heating medium outlet temperature sensor T2. The heating medium inlet temperature sensor T1 outputs a signal corresponding to the temperature of a heating medium to be supplied to the regenerator 11. The heating medium outlet temperature sensor T2 outputs a signal corresponding to the temperature of a heating medium discharged from the regenerator 11. The heating medium inlet temperature sensor T1 and the heating medium outlet temperature sensor T2 are attached closer to the regenerator 11 than the heating medium bypass pipe 11c, and transmit signals corresponding to the temperature of a heating medium at this position to the control device 30.

Further, the second cooling water pipe 14a is provided with a cooling water inlet temperature sensor T3. The cooling water inlet temperature sensor T3 outputs a signal corresponding to the temperature of cooling water to be supplied to the absorber 14 to the control device 30. The first cooling water pipe 12a is provided with a cooling water outlet temperature sensor T4. The cooling water outlet temperature sensor T4 outputs a signal corresponding to the temperature of the cooling water discharged from the condenser 12 to the control device 30.

Similarly, the cold water pipe 13a is provided with a cold water inlet temperature sensor T5 and a cold water outlet temperature sensor T6. The cold water inlet temperature sensor T5 outputs a signal corresponding to the temperature of cold water to be supplied to the evaporator 13. The cold water outlet temperature sensor T6 outputs a signal corresponding to the temperature of the cold water discharged from the evaporator 13. The cold water inlet temperature sensor T5 and the cold water outlet temperature sensor T6 are attached closer to the evaporator 13 than the cold water inlet shut-off valve V4 and the cold water outlet shut-off valve V5, and transmit signals corresponding to the temperature of the cold water at this position to the control device 30.

One end of a cooling water drainage channel 15 is connected to a position of the second cooling water pipe 14a, which is between the cooling water inlet shut-off valve V2 and the cooling water inlet temperature sensor T3, and the other end thereof is an open end. A cooling water drain valve V6 is provided on the cooling water drainage channel 15. When the cooling water drain valve V6 is opened, the cooling water in the first cooling water pipe 12a and the second cooling water pipe 14a is drained through the cooling water drainage channel 15.

One end of a dilute solution bypass pipe 17 is connected to the solution circulation pipe 16, and the other end thereof is connected to the refrigerant distributor 13b. A dilute solution bypass valve V7 is provided on the dilute solution bypass pipe 17. When the dilute solution bypass valve V7 is opened, a dilute solution in the solution circulation pipe 16 is supplied to the refrigerant distributor 13b.

The cold water pipe 13a is connected to the indoor unit in the above description, and the present disclosure is not limited to this example. The cold water pipe 13a may be connected to an industrial cooling device (an example of an external target device).

The cooling tower 20 supplies cooling water to the cold/hot water machine body 10 and cools the cooling water warmed by the cold/hot water machine body 10. The cooling tower 20 includes, for example, a tank, which stores cooling water, at a bottom portion thereof.

The cooling tower 20 and the second cooling water pipe 14a (the cooling water inlet shut-off valve V2) are connected by a first pipe 21. The cooling tower 20 and the first cooling water pipe 12a (the cooling water outlet shut-off valve V3) are connected by a second pipe 22. The cooling water from the cooling tower 20 reaches the second cooling water pipe 14a (the absorber 14) via the cooling water inlet shut-off valve V2 from the first pipe 21, reaches the first cooling water pipe 12a (the condenser 12) from the second cooling water pipe 14a, and returns to the cooling tower 20 via the cooling water outlet shut-off valve V3 and the second pipe 22. The first pipe 21 and the second pipe 22 do not need to increase the thermal conductivity like the first cooling water pipe 12a and the second cooling water pipe 14a, and are formed of, for example, a pipe subjected to corrosion resistant molten zinc plating.

The cooling water pump P3 is provided on the first pipe 21. The cooling water pump P3 serves as a power source for circulating cooling water as described above.

The cooling tower 20 includes a cooling tower drain valve V8. The cooling tower drain valve V8 is opened when draining is performed from a cooling water storage tank of the cooling tower 20. On the other hand, when cooling water is circulated through the first pipe 21, the second pipe 22, the first cooling water pipe 12a, and the second cooling water pipe 14a, the cooling tower drain valve V8 is closed.

A first communication pipe (heating medium supply pipe) CP1 is connected to the heating medium pipe 11a at one end thereof, and is connected to the second cooling water pipe 14a at the other end thereof. To explain in detail, the one end of the first communication pipe CP1 is connected to a position of the heating medium pipe 11a, which is closer to the regenerator 11 than the heating medium inlet temperature sensor T1, and the other end is connected to a position of the second cooling water pipe 14a, which is closer to the cooling water inlet shut-off valve V2 than the cooling water inlet temperature sensor T3. A first communication valve (control valve) CB1 is provided on the first communication pipe CP1.

A second communication pipe (cooling water discharge pipe) CP2 is connected to the first cooling water pipe 12a at one end thereof and is connected to the heating medium pipe 11a at the other end thereof. To explain in detail, the one end of the second communication pipe CP2 is connected to a position of the first cooling water pipe 12a, which is closer to the cooling water outlet shut-off valve V3 than the cooling water outlet temperature sensor T4, and the other end is connected to a position of the heating medium pipe 11a, which is closer to the regenerator 11 than the heating medium outlet temperature sensor T2. A second communication valve (control valve) CB2 is provided on the second communication pipe CP2.

A third communication pipe (second heating medium supply pipe) CP3 is connected to the heating medium pipe 11a at one end thereof, and is connected to the cold water pipe 13a at the other end thereof. To explain in detail, the one end of the third communication pipe CP3 is connected to a position of the heating medium pipe 11a, which is closer to the regenerator 11 than the heating medium inlet temperature sensor T1, and the other end is connected to a position of the cold water pipe 13a, which is closer to the cold water inlet shut-off valve V4 than the cold water inlet temperature sensor T5. A third communication valve (second control valve) CB3 is provided on the third communication pipe CP3.

A fourth communication pipe (cold water discharge pipe) CP4 is connected to the cold water pipe 13a at one end thereof and is connected to the heating medium pipe 11a at the other end thereof. To explain in detail, one end of the fourth communication pipe CP4 is connected to a position of the cold water pipe 13a, which is closer to the cold water outlet shut-off valve V5 than the cold water outlet temperature sensor T6, and the other end is connected to a position of the heating medium pipe 11a, which is closer to the regenerator 11 than the heating medium outlet temperature sensor T2. A fourth communication valve (second control valve) CB4 is provided on the fourth communication pipe CP4.

The control device 30 controls the entire absorption chiller 1. The control device 30 includes a cooling water temperature detector (cooling water temperature detector) 31 and a cold water temperature detector (cold water temperature detector) 32. The cooling water temperature detector 31 detects the temperature of cooling water based on signals from at least one of the cooling water inlet temperature sensor T3 and the cooling water outlet temperature sensor T4. The cold water temperature detector 32 detects the temperature of cold water based on signals from at least one of the cold water inlet temperature sensor T5 and the cold water outlet temperature sensor T6.

Further, the control device 30 controls the cooling operation, and executes the following control in winter. First, wet lay-up with clear water is performed in winter. Therefore, in the absorption chiller 1 according to the first embodiment, the first cooling water pipe 12a and the second cooling water pipe 14a are flushed (washed) first, and then, the cooling water inlet shut-off valve V2 and the cooling water outlet shut-off valve V3 are closed, so that the first cooling water pipe 12a and the second cooling water pipe 14a are in a state of being filled with clear water (cooling water). On the cooling tower 20 side, the cooling tower drain valve V8 is opened to allow drainage. In a state in which the first cooling water pipe 12a and the second cooling water pipe 14a are filled with the cooling water, the cooling water drain valve V6 is opened.

Here, when the first cooling water pipe 12a and the second cooling water pipe 14a are filled with cooling water, the cooling water inlet shut-off valve V2 and the cooling water outlet shut-off valve V3 may be manually closed by an operator or may be closed depending on control from the control device 30. The same applies to the three-way valve V1, the cooling tower drain valve V8, and the cooling water drain valve V6.

Accordingly, in a wet lay-up state in which the pipe is filled with cooling water, when the temperature detected by the cooling water temperature detector 31 is equal to or lower than a predetermined temperature (that is, when freezing may occur), the control device 30 executes a first control in which the first and second communication valves CB1 and CB2 are opened, and the heating medium pump P1 is operated. The three-way valve V1 is controlled so as not to bypass the regenerator 11. As a result, the control device 30 causes a heating medium in the heating medium pipe 11a to be introduced into the second cooling water pipe 14a via the first communication pipe CP1. By the introduction of the heating medium, freezing of the first cooling water pipe 12a and the second cooling water pipe 14a is prevented. The cooling water filling the first cooling water pipe 12a and the second cooling water pipe 14a is pushed out by the heating medium, and reaches the heating medium pipe 11a through the second communication pipe CP2.

Further, the wet lay-up may be performed for the cold water pipe 13a in winter. In this case, the cold water inlet shut-off valve V4 and the cold water outlet shut-off valve V5 are closed, and the cold water pipe 13a is in a state of being filled with cold water. Here, in the wet lay-up states of the first cooling water pipe 12a, the second cooling water pipe 14a, and the cold water pipe 13a, when the temperature detected by the cooling water temperature detector 31 is equal to or lower than a predetermined temperature, or when the temperature detected by the cold water temperature detector 32 is equal to or lower than a specific temperature, the control device 30 preferably executes a second control of opening the third and fourth communication valves CB3 and CB4, in addition to the first control. In this case, the heating medium reaches the cold water pipe 13a through the third communication pipe CP3. The cold water in the cold water pipe 13a reaches the heating medium pipe 11a through the fourth communication pipe CP4. As described above, not only freezing of the first cooling water pipe 12a and the second cooling water pipe 14a but also freezing of the cold water pipe 13a can be prevented. Moreover, when the temperature of the cooling water is equal to or lower than a predetermined temperature or when the temperature of the cold water is equal to or lower than a specific temperature, the above control is performed. Therefore, in an environment in which freezing may occur, even in an environment in which the temperature of one of the cooling water and the cold water is less likely to be lowered (for example, an environment in which only one of the cooling water and the cold water is less likely to be cooled since a heating device is provided around the absorption chiller 1), both the first control and the second control are executed if the temperature of the other one of the cooling water and the cold water is lowered. Therefore, freezing can be further prevented.

Figure 2:
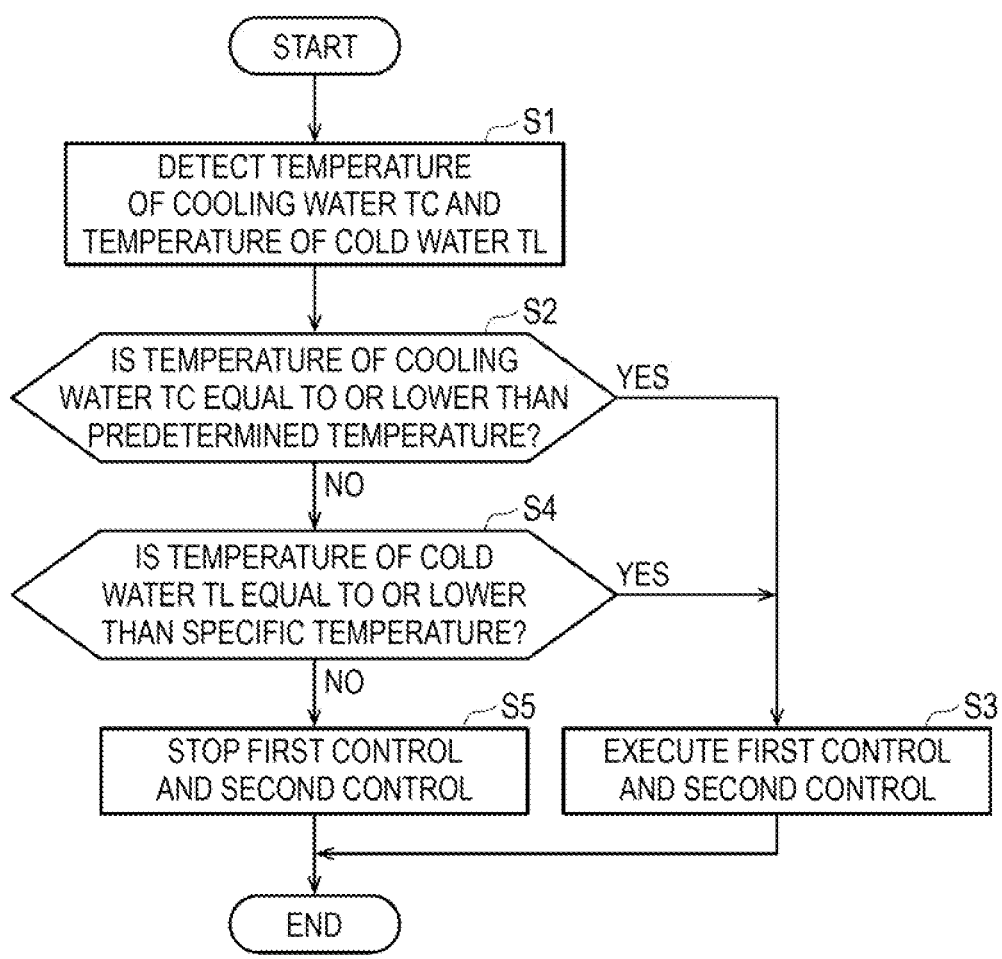
FIG. 2 is a flowchart showing operation of the absorption chiller according to the first embodiment.

Next, the operation of the absorption chiller 1 according to the first embodiment will be described. FIG. 2 is a flowchart showing the operation of the absorption chiller 1 according to the first embodiment. The operation in the flowchart shown in FIG. 2 is, for example, repeatedly executed at predetermined time intervals until a power supply of the absorption chiller 1 is turned off. In the processing shown in FIG. 2, the first cooling water pipe 12a, the second cooling water pipe 14a, and the cold water pipe 13a are in wet lay-up states in advance.

First, the cooling water temperature detector 31 and the cold water temperature detector 32 respectively detect the temperature of cooling water TC and the temperature of cold water TL based on signals from the sensors T3 to T6 (S1). Next, the control device 30 determines whether the temperature of cooling water TC (which may be an average value of values from the sensors T3 and T4, or may be a lower value or a higher value) detected in step S1 is equal to or lower than a predetermined temperature (S2). The predetermined temperature has hysteresis.

When the temperature of cooling water TC is equal to or lower than the predetermined temperature (S2: YES), the control device 30 executes the first control and the second control (S3). That is, the control device 30 causes the heating medium pump P1 to operate and causes the first to fourth communication valves CB1 to CB4 to be opened. The control device 30 controls the three-way valve V1 so as not to bypass the regenerator 11. Then, the processing shown in FIG. 2 ends.

On the other hand, when the temperature of cooling water TC is not equal to or lower than the predetermined temperature (S2: NO), the control device 30 determines whether the temperature of cold water TL (which may be an average value of values from the sensors T5 and T6, or may be a lower value or a higher value) detected in step S1 is equal to or lower than a specific temperature (S4). The specific temperature has hysteresis.

When the temperature of cold water TL is equal to or lower than the specific temperature (S4: YES), the control device 30 executes the first control and the second control (S3). Then, the processing shown in FIG. 2 ends. On the other hand, when the temperature of cold water TL is not equal to or lower than the specific temperature (S4: NO), the control device 30 stops executing both the first control and the second control (S5). That is, the control device 30 stops the operation of the heating medium pump P1 and closes the first to fourth communication valves CB1 to CB4. The control device 30 controls the three-way valve V1 in a direction to bypass the regenerator 11. Then, the processing shown in FIG. 2 ends.

In this way, according to the absorption chiller 1 of the first embodiment, in the wet lay-up states of the first cooling water pipe 12a and the second cooling water pipe 14a, the first and second communication valves CB1 and CB2 are opened to introduce the heating medium in the heating medium pipe 11a into the first and second cooling water pipes 12a and 14a when the detected temperature of cooling water is equal to or lower than the predetermined temperature. Therefore, even when the heating function is not provided or when the heating operation is not desired, freezing can be prevented by using the heating medium when using a configuration in which regeneration is performed with a heating medium. Therefore, it is possible to provide the absorption chiller 1 that can prevent damage to a device due to freezing while keeping the wet lay-up.

In the wet lay-up states of the first cooling water pipe 12a, the second cooling water pipe 14a, and the cold water pipe 13a, when the detected temperature of cooling water is equal to or lower than the predetermined temperature, or when the detected temperature of cold water is equal to or lower than the specific temperature, the first to fourth communication valves CB1 to CB4 are opened to introduce the heating medium in the heating medium pipe 11a into the first and second cooling water pipes 12a and 14a, and the cold water pipe 13a.

Therefore, for example, even when one of the temperature of cooling water and the temperature of cold water is lowered, the heating medium in the heating medium pipe 11a is introduced into both the first and second cooling water pipes 12a and 14a, and the cold water pipe 13a. Therefore, even when one of the temperature of cooling water and the temperature of cold water is detected to be high from the relationships among installation positions of the temperature sensors T3 to T6, the heating medium can be introduced into both the first and second cooling water pipes 12a and 14a and the cold water pipe 13a to prevent further freezing if the temperature of the other one of the temperature of cooling water and the temperature of cold water is lowered.

Next, a second embodiment of the present disclosure will be described. An absorption chiller according to the second embodiment is the same as that of the first embodiment except that a part of the configuration is different. Hereinafter, differences from the first embodiment will be described.

Figure 3:
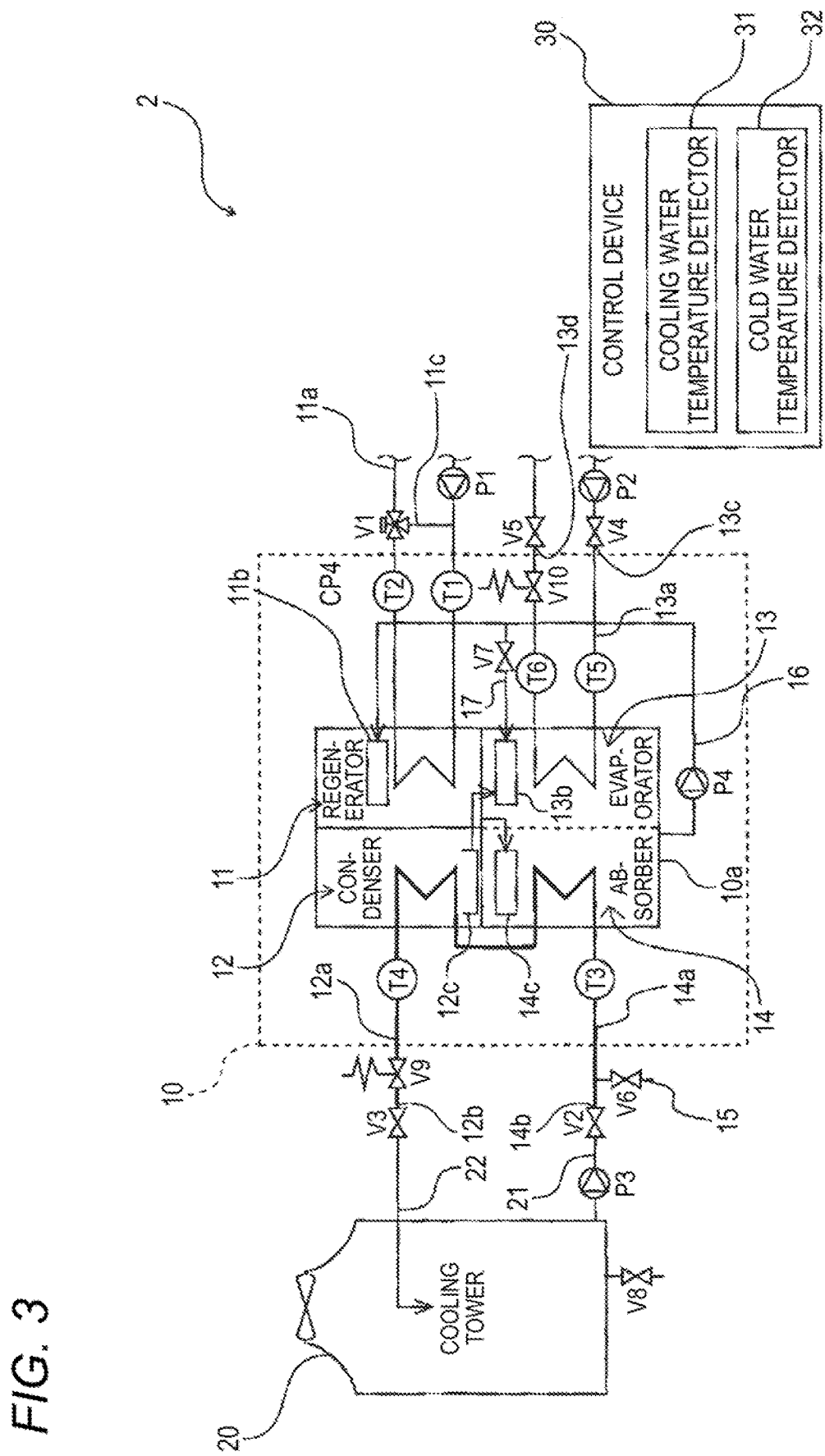
FIG. 3 is a diagram showing a configuration of an absorption chiller according to a second embodiment.

FIG. 3 is a diagram showing a configuration of the absorption chiller according to the second embodiment. As shown in FIG. 3, an absorption chiller 2 according to the second embodiment includes a first pressure relief valve (pressure relief valve) V9 and a second pressure relief valve V10 in addition to those of the absorption chiller 1 according to the first embodiment. The absorption chiller 2 according to the second embodiment does not include the communication pipes CP1 to CP4 and the communication valves CB1 to CB4 of the absorption chiller 1 according to the first embodiment.

The first and second pressure relief valves V9 and V10 are valve mechanisms that maintain a closed state until set pressure is reached, and are opened once the set pressure is reached. The first pressure relief valve V9 is provided at a position of the first cooling water pipe 12a, which is between the cooling water outlet shut-off valve V3 and the cooling water outlet temperature sensor T4. The first pressure relief valve V9 may be provided at other positions of the first cooling water pipe 12a, the second cooling water pipe 14a, or the like. The second pressure relief valve V10 is provided at a position of the cold water pipe 13a, which is between the cold water outlet shut-off valve V5 and the cold water outlet temperature sensor T6. The second pressure relief valve V10 may be provided at other positions of the cold water pipe 13a.

In the absorption chiller 2 according to the second embodiment, the heating medium is not introduced into the first and second cooling water pipes 12a and 14a and the cold water pipe 13a, and the first and second cooling water pipes 12a and 14a and the cold water pipe 13a are heated by heating a dilute solution in the regenerator 11. As a result, for example, when an anti-freezing agent is mixed with a heating medium, the freezing can be prevented without mixing the liquid.

To explain in detail in the second embodiment, in a wet lay-up state in which the first and second cooling water pipes 12a and 14a are filled with cooling water, when temperature detected by the cooling water temperature detector 31 is equal to or lower than the predetermined temperature (that is, when freezing may occur), the control device 30 causes the dilute solution to be heated in the regenerator 11. The concentrated solution thus obtained is supplied to the concentrated solution distributor 14c of the absorber 14 and is sprayed onto the first cooling water pipe 12a. As a result, heat is exchanged between the concentrated solution and the cooling water in the second cooling water pipe 14a to prevent freezing of the cooling water. A vapor refrigerant obtained by heating the dilute solution is heat-exchanged with cooling water in the first cooling water pipe 12a to prevent freezing of the cooling water. At this time, the internal pressure of the first and second cooling water pipes 12a and 14a may increase, but damage is prevented by the first pressure relief valve V9.

Here, in wet lay-up states in which the first and second cooling water pipes 12a and 14a are filled with cooling water and the cold water pipe 13a is filled with cold water, when temperature detected by the cooling water temperature detector 31 is equal to or lower than a predetermined temperature, or when temperature detected by the cold water detector 32 is equal to or lower than a specific temperature, the control device 30 preferably causes the dilute solution bypass valve V7 to open and causes the solution pump P4 to operate in addition to the heating of the dilute solution. In this case, the dilute solution reaches the refrigerant distributor 13b via the dilute solution bypass pipe 17 from the solution circulation pipe 16 and is sprayed to the cold water pipe 13a from the refrigerant distributor 13b. As a result, heat is exchanged between the sprayed dilute solution and the cold water in the cold water pipe 13a to prevent freezing of the cold water. At this time, the internal pressure of the cold water pipe 13a may increase, but damage is prevented by the second pressure relief valve V10.

Figure 4:
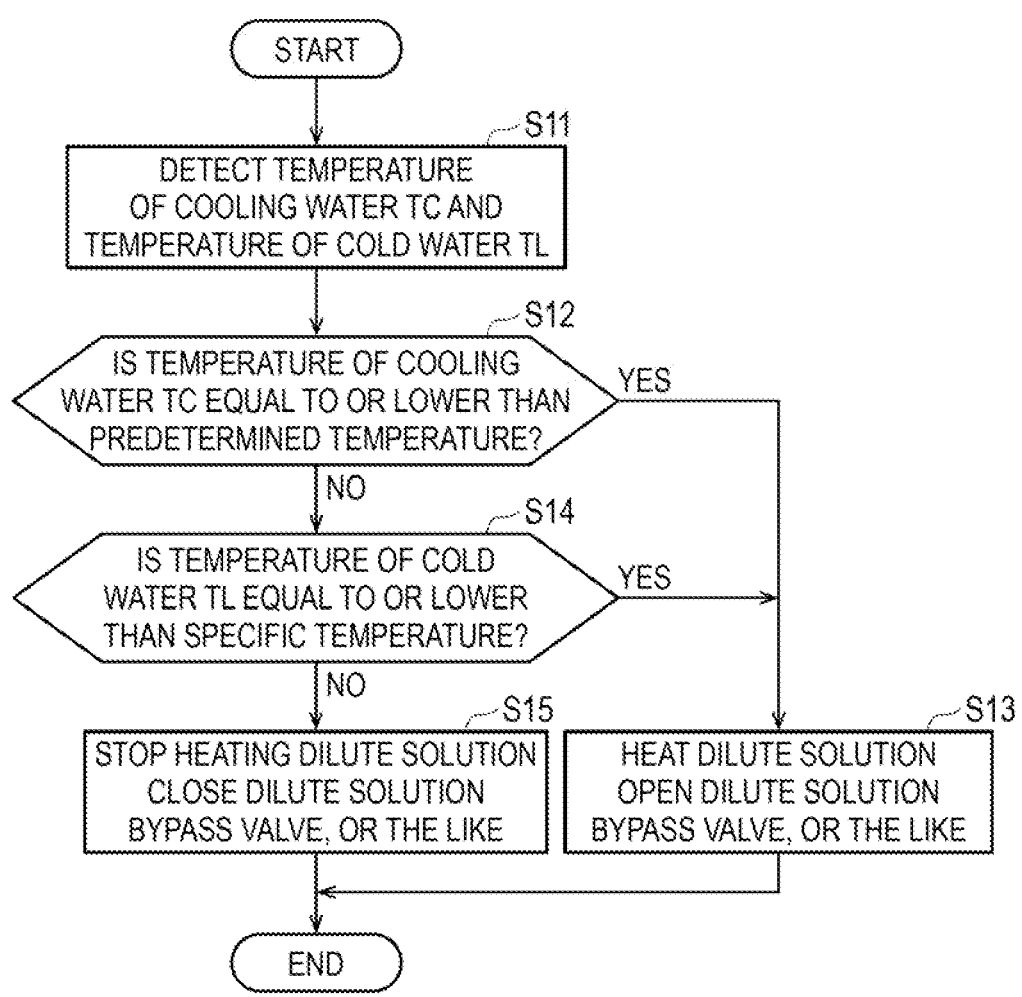
FIG. 4 is a flowchart showing operation of the absorption chiller according to the second embodiment.

Next, the operation of the absorption chiller 2 according to the second embodiment will be described. FIG. 4 is a flowchart showing the operation of the absorption chiller 2 according to the second embodiment. The operation in the flowchart shown in FIG. 4 is repeatedly executed at predetermined time intervals until a power supply of the absorption chiller 2 is turned off. In the processing shown in FIG. 4, the first cooling water pipe 12a, the second cooling water pipe 14a, and the cold water pipe 13a are in wet lay-up states in advance.

First, the cooling water temperature detector 31 and the cold water temperature detector 32 respectively detect the temperature of cooling water TC and the temperature of cold water TL based on signals from the sensors T3 to T6 (S11). Next, the control device 30 determines whether the temperature of cooling water TC (which may be an average value of values from the sensors T3 and T4, or may be a lower value or a higher value) detected in step S11 is equal to or lower than a predetermined temperature (S12). The predetermined temperature has hysteresis.

When the temperature of cooling water TC is equal to or lower than the predetermined temperature (S12: YES), the control device 30 causes the dilute solution to be heated by a heating medium (S13). That is, the control device 30 causes the heating medium pump P1 to operate and controls the three-way valve V1 so as not to bypass the regenerator 11. In addition, the control device 30 causes the solution pump P4 to operate. The control device 30 causes the dilute solution bypass valve V7 to be opened (S13). Thereafter, the processing shown in FIG. 4 ends.

On the other hand, when the temperature of cooling water TC is not equal to or lower than the predetermined temperature (S12: NO), the control device 30 determines whether the temperature of cold water TL (which may be an average value of values from the sensors T5 and T6, or may be a lower value or a higher value) detected in step S1 is equal to or lower than a specific temperature (S14). The specific temperature has hysteresis.

When the temperature of cold water TL is equal to or lower than the specific temperature (S14: YES), the control device 30 causes the dilute solution to be heated by a heating medium (S13). The control device 30 causes the dilute solution bypass valve V7 to be opened (S13). Thereafter, the processing shown in FIG. 4 ends.

On the other hand, when the temperature of cold water TL is not equal to or lower than the specific temperature (S14: NO), the control device 30 stops the heating of the dilute solution by the heating medium and causes the dilute solution bypass valve V7 to be closed (SIS). Thereafter, the processing shown in FIG. 4 ends.

In this way, according to the absorption chiller 2 of the second embodiment, in the wet lay-up states of the first cooling water pipe 12a and the second cooling water pipe 14a, the dilute solution is heated to exchange heat with the cooling water in the first and second cooling water pipes 12a and 14a when the detected temperature of cooling water is equal to or lower than the predetermined temperature. Therefore, the cooling water is heated, and freezing can be prevented. At this time, the internal pressure of the first and second cooling water pipes 12a and 14a may increase, but damage is also prevented by the first pressure relief valve V9. Therefore, it is possible to provide the absorption chiller 2 that can prevent damage to a device due to freezing while keeping the wet lay-up.

In the wet lay-up states of the first cooling water pipe 12a, the second cooling water pipe 14a, and the cold water pipe 13a, when the detected temperature of cooling water is equal to or lower than the predetermined temperature, or when the temperature of cold water is equal to or lower than the specific temperature, the dilute solution is heated to exchange heat with the cooling water in the first and second cooling water pipes 12a and 14a, and the dilute solution bypass valve V7 is opened to introduce the dilute solution into the evaporator 13 and heat exchange is performed. Therefore, freezing of cold water is also prevented. At this time, the internal pressure of the cold water pipe 13a may increase, but damage is also prevented by the second pressure relief valve V10. Therefore, it is possible to provide the absorption chiller 2 that can prevent damage to a device due to freezing while keeping the wet lay-up.

The present disclosure has been described based on the embodiments, but the present disclosure is not limited to the embodiments described above and can be appropriately modified without departing from the spirit of the present disclosure, and other technologies may be appropriately combined within a possible range. Further, known or well-known techniques may be combined to the present disclosure within a possible range.

For example, the cooling water inlet 14b and the cooling water outlet 12b are exposed to the outside of the housing 10a in the above embodiment, but the present disclosure is not limited thereto. That is, the cooling water inlet 14b and the cooling water outlet 12b may be located inside the housing 10a, or positions of the cooling water inlet 14b and the cooling water outlet 12b may coincide with a position of a wall surface of the housing 10a. In addition, positions of the cooling water inlet shut-off valve V2 and the cooling water outlet shut-off valve V3 may also be inside the housing 10a, or may coincide with the position of the wall surface of the housing 10a correspondingly.

Figure 5:
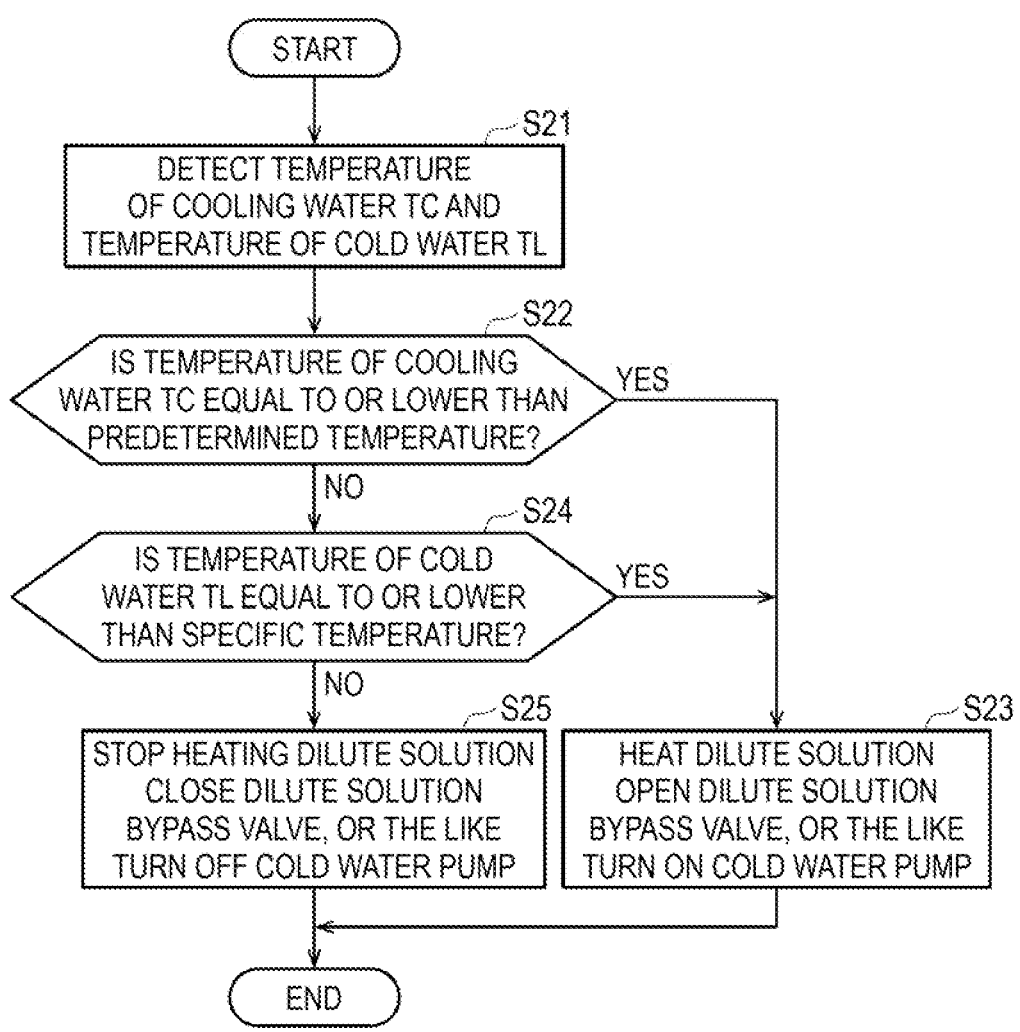
FIG. 5 is a flowchart showing operation of an absorption chiller according to a modification of the second embodiment.

An example in which the cold water inlet shut-off valve V4 and the cold water outlet shut-off valve V5 are closed without performing circulation of cold water has been described in the second embodiment, but the present disclosure is not limited to this example. For example, the control may be performed as follows when the circulation of cold water can be performed. FIG. 5 is a flowchart showing operation of the absorption chiller 2 according to a modification of the second embodiment. Also in FIG. 5, the operation in the flowchart is repeatedly executed at predetermined time intervals until the power supply of the absorption chiller 2 is turned off. The absorption chiller 2 according to the modification may not include the cold water inlet shut-off valve V4, the cold water outlet shut-off valve V5, and the second pressure relief valve V10.

First, in steps 21 and S22 shown in FIG. 5, the same processing as that of steps S11 and S12 shown in FIG. 4 are executed. When the temperature of cooling water TC is equal to or lower than a predetermined temperature (S22: YES), the control device 30 causes a dilute solution to be heated by a heating medium and causes the dilute solution bypass valve V7 to be opened (S23). Further, the control device 30 causes the cold water pump P2 to operate to circulate the cold water. This circulation further prevents freezing of cold water. An increase in the internal pressure of the cold water pipe 13a is prevented by a cistern on the indoor unit side or the like. Thereafter, the processing shown in FIG. 5 ends.

On the other hand, when the temperature of cooling water TC is not equal to or lower than the predetermined temperature (S22: NO), the control device 30 determines whether the temperature of cold water TL (which may be an average value of values from the sensors T5 and T6, or may be a lower value or a higher value) detected in step S21 is equal to or lower than a specific temperature (S24).

When the temperature of cold water TL is equal to or lower than the specific temperature (S24: YES), the processing proceeds to step S23, and then the processing shown in FIG. 5 ends.

When the temperature of cold water TL is not equal to or lower than the specific temperature (S24: NO), the control device 30 stops heating of the dilute solution by the heating medium and causes the dilute solution bypass valve V7 to be closed (S25). Further, the control device 30 stops the operation of the cold water pump P2. Thereafter, the processing shown in FIG. 5 ends.

Even in the modification as described above, similar to the second embodiment, it is possible to prevent damage to a device due to freezing while keeping the wet lay-up. Furthermore, freezing can also be prevented by circulating cold water.

According to an aspect of the present disclosure, an absorption chiller configured to obtain a cold water by a cooling cycle having a regenerator, a condenser, an evaporator, and an absorber includes a cooling water pipe that extends from a cooling water inlet to a cooling water outlet via the absorber and the condenser, the cooling water inlet being configured to receive a cooling water from a cooling tower, and the cooling water outlet being configured to discharge the cooling water toward the cooling tower; a heating medium pipe configured to supply a heating medium to the regenerator and to discharge the heating medium whose temperature is lowered in response to heating of a dilute solution in the regenerator; a cooling water inlet shut-off valve provided on the cooling water inlet; a cooling water outlet shut-off valve provided on the cooling water outlet; a heating medium supply pipe configured to supply the heating medium from the heating medium pipe to the cooling water pipe; a cooling water discharge pipe configured to discharge the cooling water from the cooling water pipe to the heating medium pipe; a first control valve provided on the heating medium supply pipe and the cooling water discharge pipe, respectively; a cooling water temperature detector configured to detect a temperature of the cooling water in the cooling water pipe; and a controller configured to cause the first control valve to be opened and to cause the heating medium in the heating medium pipe to be introduced into the cooling water pipe, when the temperature detected by the cooling water temperature detector is equal to or lower than a predetermined temperature, in a wet lay-up state including a state in which the cooling water inlet shut-off valve and the cooling water outlet shut-off valve are closed and the cooling water pipe is filled with the cooling water.

The absorption chiller according to the aspect of the present disclosure further includes: a cold water pipe configured to supply the cold water received from a cold water inlet to the evaporator, and to supply the cold water cooled by the evaporator from a cold water outlet to an external target device; a cold water inlet shut-off valve provided on the cold water inlet; a cold water outlet shut-off valve provided on the cold water outlet; a cold water temperature detector configured to detect a temperature of the cold water in the cold water pipe; a second heating medium supply pipe configured to supply the heating medium from the heating medium pipe to the cold water pipe; a cold water discharge pipe configured to discharge the cold water from the cold water pipe to the heating medium pipe; and a second control valve provided on the second heating medium supply pipe and the cold water discharge pipe, respectively. The controller causes the first control valve and the second control valve to be opened, and causes the heating medium in the heating medium pipe to be introduced into the cooling water pipe and the cold water pipe, when the temperature detected by the cooling water temperature detector is equal to or lower than the predetermined temperature, or when a temperature detected by the cold water temperature detector is equal to or lower than a specific temperature, in the wet lay-up further including a state in which the cold water inlet shut-off valve and the cold water outlet shut-off valve are closed and the cold water pipe is filled with the cold water.

According to another aspect of the present disclosure, an absorption chiller configured to obtain a cold water by a cooling cycle having a regenerator, a condenser, an evaporator, and an absorber includes: a cold water pipe configured to supply the cold water received from a cold water inlet to the evaporator, and to supply the cold water cooled by the evaporator from a cold water outlet to an external target device; a cooling water pipe that extends from a cooling water inlet to a cooling water outlet via the absorber and the condenser, a cooling water inlet being configured to receive a cooling water from a cooling tower, a cooling water outlet being configured to discharge the cooling water toward the cooling tower; a heating medium pipe configured to supply a heating medium to the regenerator and to discharge the heating medium whose temperature is lowered in response to heating of a dilute solution in the regenerator; a cooling water inlet shut-off valve provided on the cooling water inlet; a cooling water outlet shut-off valve provided on the cooling water outlet; a cooling water temperature detector configured to detect a temperature of the cooling water in the cooling water pipe; a controller configured to cause the dilute solution in the regenerator to be heated by the heating medium and to cause an obtained concentrated solution to be supplied to the absorber so as to perform a heat exchange with the cooling water in the cooling water pipe, and to cause a vapor refrigerant generated by the heating of the dilute solution to perform the heat exchange with the cooling water of the cooling water pipe in the condenser, when the temperature detected by the cooling water temperature detector is equal to or lower than a predetermined temperature, in a wet lay-up state including a state in which the cooling water inlet shut-off valve and the cooling water outlet shut-off valve are closed and the cooling water pipe is filled with the cooling water, and a first pressure relief valve provided on the cooling water pipe, the pressure relief valve being configured to relieve an internal pressure in the cooling water pipe generated from heat exchange by the controller.

The absorption chiller according to the another aspect of the present disclosure further includes: a cold water inlet shut-off valve provided on the cold water inlet; a cold water outlet shut-off valve provided on the cold water outlet; a cold water temperature detector configured to detect a temperature of the cold water in the cold water pipe; a dilute solution pipe that connects a lower portion of the absorber between the regenerator; a dilute solution bypass pipe whose one end is provided on the dilute solution pipe and configured to supply the dilute solution to an upper portion of the evaporator; a dilute solution bypass valve provided on the dilute solution bypass pipe; and a second pressure relief valve provided on the cold water pipe. The controller is configured to further cause the dilute solution bypass valve to be opened and to cause the dilute solution to be supplied to the upper portion of the evaporator so as to perform the heat exchange with the cold water in the cold water pipe, when the temperature detected by the cooling water temperature detector is equal to or lower than the predetermined temperature, or when a temperature detected by the cold water temperature detector is equal to or lower than a specific temperature, in the wet lay-up state further including a state in which the cold water inlet shut-off valve and the cold water outlet shut-off valve are closed and the cold water pipe is filled with the cold water. The second pressure relief valve is configured to relieve an internal pressure in the cold water pipe generated from heat exchange by the controller.

According to the absorption chiller of the present disclosure, it is possible to prevent damage to a device due to freezing while keeping the wet lay-up.

What is claimed is:

1. An absorption chiller configured to obtain a cold water by a cooling cycle having a regenerator, a condenser, an evaporator, and an absorber, the absorption chiller comprising:
   a cooling water pipe that extends from a cooling water inlet to a cooling water outlet via the absorber and the condenser, the cooling water inlet being configured to receive a cooling water from a cooling tower, and the cooling water outlet being configured to discharge the cooling water toward the cooling tower;
   a heating medium pipe configured to supply a heating medium pinto the regenerator and to discharge the heating medium whose temperature is lowered in response to heating of a dilute solution in the regenerator;
   a cooling water inlet shut-off valve provided on the cooling water inlet;
   a cooling water outlet shut-off valve provided on the cooling water outlet;
   a heating medium supply pipe configured to supply the heating medium from the heating medium pipe into the cooling water pipe;
   a cooling water discharge pipe configured to discharge the cooling water from the cooling water pipe into the heating medium pipe;
   a first control valve and a second control valve provided on the heating medium supply pipe and the cooling water discharge pipe, respectively;
   a cooling water temperature detector configured to detect a temperature of the cooling water in the cooling water pipe; and
   a controller configured to cause the first control valve and the second control valve to be opened and to cause the heating medium in the heating medium pipe to be introduced into the cooling water pipe, based on the temperature detected by the cooling water temperature detector being equal to or lower than a predetermined temperature, in a wet lay-up state including a state in which the cooling water inlet shut-off valve and the cooling water outlet shut-off valve are closed and the cooling water pipe is filled with the cooling water.

2. The absorption chiller according to claim 1, further comprising:
   a cold water pipe configured to supply the cold water received from a cold water inlet to into the evaporator, and to supply the cold water cooled by the evaporator from a cold water outlet to an external target device;
   a cold water inlet shut-off valve provided on the cold water inlet;
   a cold water outlet shut-off valve provided on the cold water outlet;
   a cold water temperature detector configured to detect a temperature of the cold water in the cold water pipe;
   a second heating medium supply pipe configured to supply the heating medium from the heating medium pipe into the cold water pipe;
   a cold water discharge pipe configured to discharge the cold water from the cold water pipe into the heating medium pipe; and
   a third control valve and a fourth control valve provided on the second heating medium supply pipe and the cold water discharge pipe, respectively,
   wherein the controller causes the first control valve, the second control valve, the third control valve, and the fourth control valve to be opened, and causes the heating medium in the heating medium pipe to be introduced into the cooling water pipe and the cold water pipe, based on the temperature detected by the cooling water temperature detector being equal to or lower than the predetermined temperature, or when a temperature detected by the cold water temperature detector is equal to or lower than a specific temperature, in the wet lay-up further including a state in which the cold water inlet shut-off valve and the cold water outlet shut-off valve are closed and the cold water pipe is filled with the cold water.

3. The absorption chiller according to claim 1, wherein the cooling water inlet shut-off valve and the cooling water outlet shut-off valve are configured to stop circulating the cold water to the absorption chiller.

4. The absorption chiller according to claim 1, wherein the first control valve and the second control valve are configured to supply the heating medium inside the heating medium pipe into the cold water pipe.

5. An absorption chiller configured to obtain a cold water by a cooling cycle having a regenerator, a condenser, an evaporator, and an absorber, the absorption chiller comprising:
   a cold water pipe configured to supply the cold water received from a cold water inlet to into the evaporator, and to supply the cold water cooled by the evaporator from a cold water outlet to an external target device;
   a cooling water pipe that extends from a cooling water inlet to a cooling water outlet via the absorber and the condenser, a cooling water inlet being configured to receive a cooling water from a cooling tower, a cooling water outlet being configured to discharge the cooling water toward the cooling tower;
   a heating medium pipe configured to supply a heating medium into the regenerator and to discharge the heating medium whose temperature is lowered in response to heating of a dilute solution in the regenerator;
   a cooling water inlet shut-off valve provided on the cooling water inlet;
   a cooling water outlet shut-off valve provided on the cooling water outlet;
   a cooling water temperature detector configured to detect a temperature of the cooling water in the cooling water pipe;
   a controller configured to cause the dilute solution in the regenerator to be heated by the heating medium and to cause an obtained concentrated solution to be supplied into the absorber so as to perform a heat exchange with the cooling water in the cooling water pipe, and to cause a vapor refrigerant generated by the heating of the dilute solution to perform the heat exchange with the cooling water of the cooling water pipe in the condenser, based on the temperature detected by the cooling water temperature detector being equal to or lower than a predetermined temperature, in a wet lay-up state including a state in which the cooling water inlet shut-off valve and the cooling water outlet shut-off valve are closed and the cooling water pipe is filled with the cooling water; and a first pressure relief valve provided on the cooling water pipe, the pressure relief valve being configured to relieve an internal pressure in the cooling water pipe generated from heat exchange by the controller.

6. The absorption chiller according to claim 5, further comprising:

a cold water inlet shut-off valve provided on the cold water inlet;

a cold water outlet shut-off valve provided on the cold water outlet;

a cold water temperature detector configured to detect a temperature of the cold water in the cold water pipe;

a dilute solution pipe that connects a lower portion of the absorber to the regenerator;

a dilute solution bypass pipe with an end provided on the dilute solution pipe and configured to supply the dilute solution to an upper portion of the evaporator;

a dilute solution bypass valve provided on the dilute solution bypass pipe; and a second pressure relief valve provided on the cold water pipe, wherein the controller is configured to further cause the dilute solution bypass valve to be opened and to cause the dilute solution to be supplied into the upper portion of the evaporator so as to perform the heat exchange with the cold water in the cold water pipe, based on the temperature detected by the cooling water temperature detector being equal to or lower than the predetermined temperature, or when a temperature detected by the cold water temperature detector is equal to or lower than a specific temperature, in the wet lay-up state further including a state in which the cold water inlet shut-off valve and the cold water outlet shut-off valve are closed and the cold water pipe is filled with the cold water, and wherein the second pressure relief valve is configured to relieve an internal pressure in the cold water pipe generated from heat exchange by the controller.

7. The absorption chiller according to claim 5, wherein the cooling water inlet shut-off valve and the cooling water outlet shut-off valve are configured to stop circulating the cold water to the absorption chiller.

* * * * *